Feb. 21, 1933.   F. C. FRANK   1,898,298

BRAKE ADJUSTING MEANS

Filed July 28, 1930

INVENTOR
FREDERICK C. FRANK.
BY  M.W. McConkey
ATTORNEY

Patented Feb. 21, 1933

1,898,298

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

BRAKE ADJUSTING MEANS

Application filed July 28, 1930. Serial No. 471,136.

This invention relates to brakes and more particularly to operating means therefor.

An object of the invention is to provide a control lever for a brake having means for adjusting the lever relative to the operating member of the brake.

Another object of the invention is to provide a control lever for the operating member of a brake having a return spring and means associated therewith for adjusting the tension of the spring to regulate the throw of the lever.

An important feature of the invention is a reinforcing plate or holder having a stop and a plurality of spaced openings providing means for regulating the throw of the operating lever.

Broadly, the invention comprehends a reinforcing plate or holder adjustably positioned on the backing plate of a brake and so connected to the operating lever that the throw of the lever may be adjusted to take up the slack in the operating cable therefor.

Other objects and advantages of the invention will appear from the following description taken in connection with the drawing, which forms a part of this specification, and in which.

Figures 1, 2:
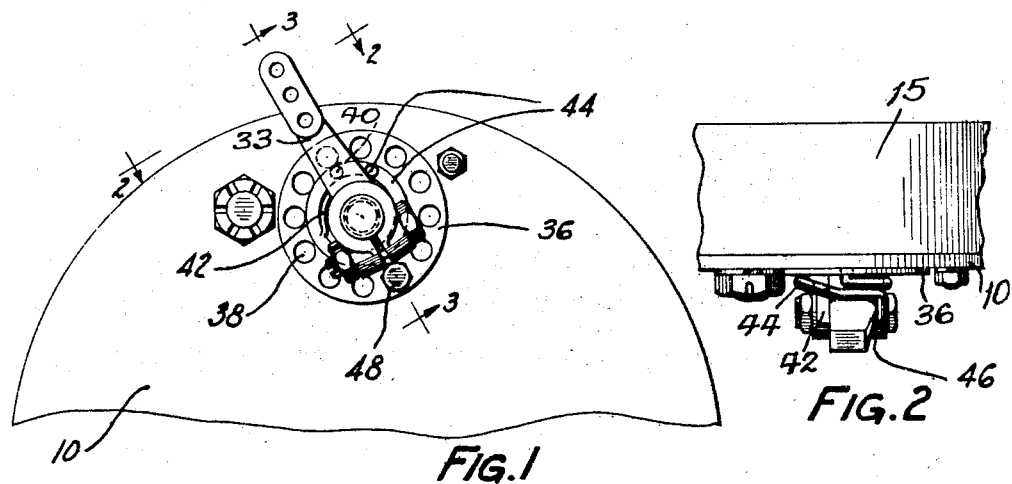
Figure 1 is a side elevation partly broken away of a backing plate having positioned thereon a control lever and means for regulating the throw of the lever embodying the invention.
Figure 2 is a sectional view substantially on line 2—2, Figure 1.

In general the embodiments illustrating my invention comprise a brake drum, brake shoes positioned within said drum, and improved means for applying the shoes to the drum. The means for applying the shoes to the drum include a shaft on one end of which there are mounted cam lobes which operate to move the shoes into brake applying relationship with the drum and on the opposite end of which there is mounted a lever by means of which the shaft and the lobes may be rotated. The lever is adjustably secured to the shaft and means are provided for adjustably positioning the lever in its normal or "brake off" position. In the embodiment illustrated in Figures 1 to 3, inclusive, and Figure 7, this means comprises a stop adjustably secured to the backing plate and a spring for normally maintaining the lever in contact with the stop. In the embodiment illustrated in Figures 4 to 6, inclusive, no stop is provided, but a spring is provided in combination with means for adjustably positioning the spring so that the normal position of the lever may be controlled.

Inasmuch as the details of the brake drum, the brake shoes, the cam lobes, and the operating shaft are the same in both of the modifications of my invention illustrated, these details will only be described once for both modifications and like numerals will be used to indicate similar parts.

Figure 6:
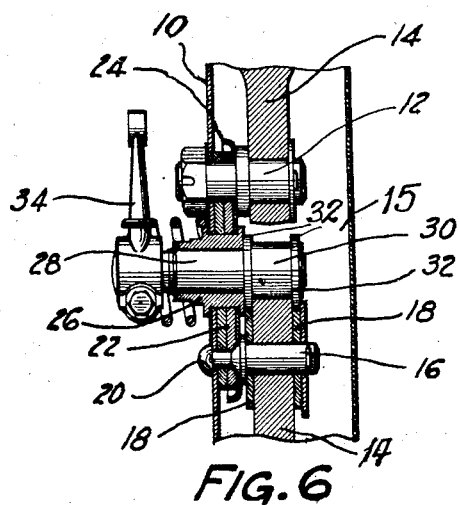
Figure 6 is a sectional view substantially on line 6—6, Figure 4.

Referring particularly to Figure 6 of the drawing, there is shown a fixed support 10, such as a backing plate. As shown, the backing plate has positioned thereon a fixed anchor 12 to which is pivoted by one end a friction element 14, the other end of which has mounted thereon as by a bolt 16, thrust rollers 18. The rollers are spaced from the end of the friction element and are arranged on opposite sides thereof, the object of the arrangement appearing hereinafter. The friction element 14, is adapted to be moved into braking relationship with a brake drum 15.

Secured to the backing plate by the anchor 12 and a rivet or other securing means 20, are reinforcing plates 22, one of which is provided with a perimetral flange 24, which lends strength and rigidity thereto. These reinforcing plates constitute a bracket which supports a sleeve 26 in which is positioned for rotation an operating shaft 28 having a cam 30 provided with corresponding oppositely disposed lobes 32 engaging the respective thrust rollers 18 on the friction element 14, and an adjustable operating lever 34.

Positioned for rotation on the shaft 28 is a disk 36 having arranged therein a circular row of openings 38 and a single opening 40, positioned inward of the row of openings 38. The openings 38 are as stated, arranged in a circle, the center of which is in the axis of the operating shaft. This disk is also provided with a stop 42 adapted to engage the operating lever when the brake mechanism is in the off position.

As shown, a coil spring 44 has one end hooked around the lever as indicated at 46 and its other end engaging the opening 40. This spring serves to return the lever against the stop, thereby taking up slack in an operating cable such as is used in connection with brake structures of this type.

A stud 48 passes through one of the openings 38 in the plate 36 and is threaded in the backing plate or reinforcing plates. By removing the stud 48 and rotating the disk 36, the position of the stop 42 and therefore the normal position of the operating lever 33 may be readily adjusted to take up slack in the operating cable.

Figures 3, 5, 7:
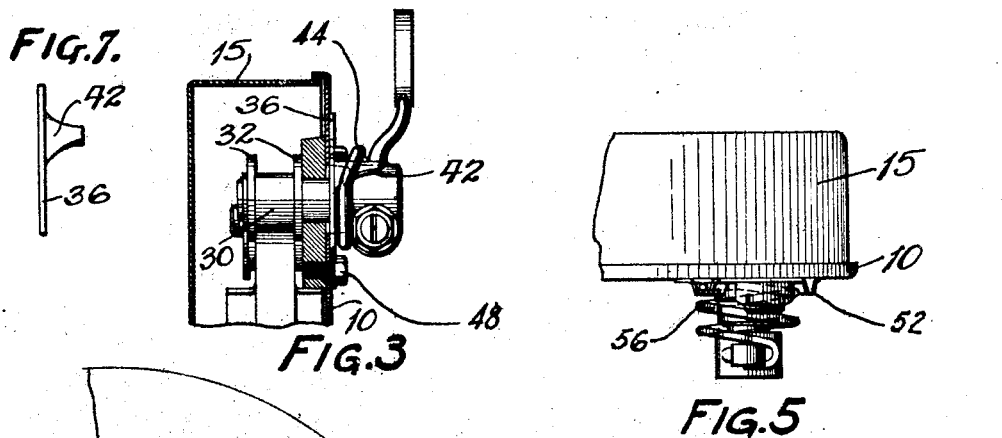
Figure 3 is a sectional view substantially on line 3—3, Figure 1.
Figure 5 is a sectional view substantially on line 5—5, Figure 4.
Figure 7 is a view in elevation of an adjusting plate and stop forming a portion of the embodiment of my invention illustrated in Figures 1 to 3, inclusive.
Figure 4:
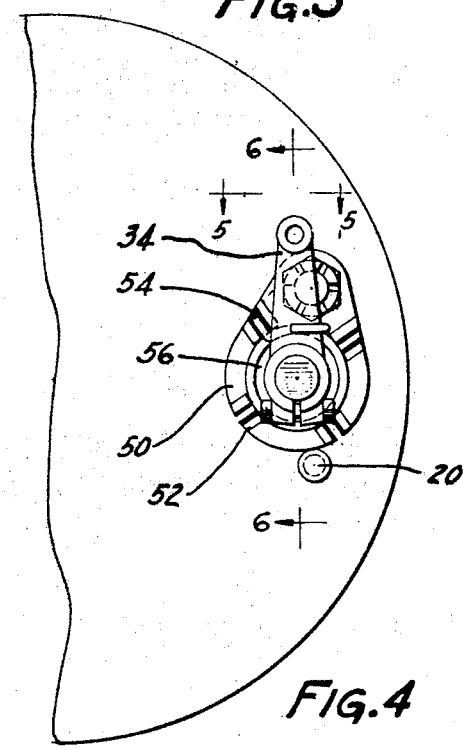
Figure 4 is a side elevation of a brake embodying a modified form of the invention.

Figures 4, 5 and 6 illustrate a modification of the invention wherein a fixed plate or holder 50 is substituted for the disk 36. This plate is secured beneath a flange on the bushing 26 and is further secured in position by the anchor 12. This plate is provided with a plurality of lugs 52 arranged in pairs in spaced relation and in a circle, the center of which is in the axis of the operating shaft. As shown, these lugs are bent up from the plate 50 to provide pockets or slots 54 adaptable for the reception of one end of a spring 56, the other end of which is hooked around the operating lever 34. This spring serves to return the lever to the off position and such position may be predetermined by selecting the slot in which to secure the springs.

While preferred embodiments of the invention have been described, it is to be understood that these are given merely as examples of the underlying principles of the invention and since these may be incorporated in other specific mechanical structures, I do not intend to be limited to those shown, except as such limitations are clearly implied by the appended claims.

Having thus described the various features of the invention, what I claim as new and desire to secure by Letters Patent is:

1. A brake comprising an operating shaft, a lever on the shaft, a lever-positioning member coaxial with the shaft, means for adjusting the position of the member and the lever and a yielding means connecting the member to the lever.

2. A brake comprising an operating shaft, a lever on the shaft, a member concentric to the shaft and movable thereon, means for adjusting the member and a spring connected between the member and the lever.

3. A brake comprising a brake drum, a friction element associated with said drum, means comprising a shaft and a lever adjustably secured to said shaft for moving said brake element into brake applying relationship with said drum, and means for resiliently maintaining said lever and said shaft in a predetermined normal position in which said friction element is spaced from said drum, said last named means comprising a plate adjustably secured in relationship to said drum, a stop associated with said plate and a spring having one end associated with said plate and the other end associated with said lever.

4. A brake comprising a brake drum, a friction element associated with said drum, means comprising a shaft and a lever adjustably secured to said shaft for moving said brake element into brake applying relationship with said drum, and means for resiliently maintaining said lever and said shaft in a predetermined normal position in which said friction element is spaced from said drum, said last named means comprising a spring bearing at one end upon said lever and having the other end adjustably connected to said drum.

5. A brake comprising a brake drum, a friction element associated with said drum, means comprising a shaft and a lever adjustably secured to said shaft for moving said brake element into brake applying relationship with said drum, and means for resiliently maintaining said lever and said shaft in a predetermined normal position in which said friction element is spaced from said drum, said means comprising a stop adjustably associated with said drum and a spring associated with said lever adjustably associated with said drum.

6. A brake comprising a brake drum, a friction element associated with said drum, means comprising a shaft and a lever adjustably secured to said shaft for moving said brake element into brake applying relationship with said drum, and a means for resiliently maintaining said lever and said shaft in a predetermined normal position in which said friction element is spaced from said drum, said last named means comprising a plate fastened to said drum and formed with a plurality of pockets, and a spring having one end secured in one of said pockets and having the other end bearing upon said lever.

7. A brake comprising a drum; a friction element positioned within said drum; a backing plate secured to said drum; an anchor pin to which one end of said friction element is secured; means for moving said friction element into contact with said drum comprising a shaft, a cylindrical element passing through the end of said friction element opposite to said anchor pin, a pair of thrust rollers rotatably mounted on opposite ends of said cylindrical element and on opposite sides of said friction element, a pair of cam lobes secured on one end of said shaft and adapted to contact with said thrust rollers, and a lever secured to the opposite end of said shaft; and means for adjustably positioning said lever and said shaft in a normal brake off position comprising a disc formed with a plurality of holes arranged in a circle concentric with said shaft, a bolt positioned in one of said holes and passing through an opening in said backing plate, a stop element secured to said disc and against which said lever is adapted to bear, and a spring having one end connected to said disc and having the other end bearing upon said lever for urging it into contact with said stop.

8. A brake comprising a drum, a friction element associated with said drum, means for urging said friction element into contact with said drum including a lever, and means for normally maintaining said lever in a predetermined position relative to said drum and for adjusting said position comprising a disc formed with a plurality of holes positioned in a circle and provided with a stop adapted to contact with said lever.

In testimony whereof, I have hereunto signed my name.

FREDERICK C. FRANK.